Aug. 13, 1946.    J. H. BARRETT    2,405,773
MAGNETIC FIXTURE
Filed Dec. 9, 1943
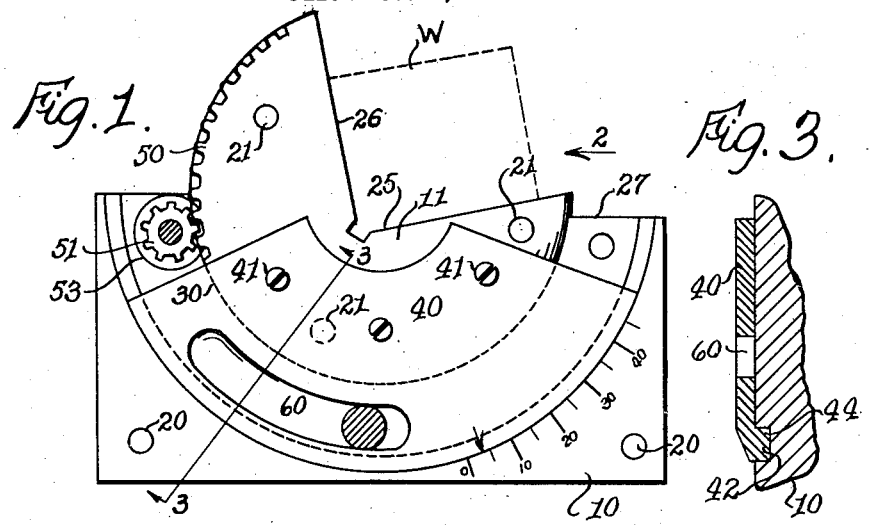
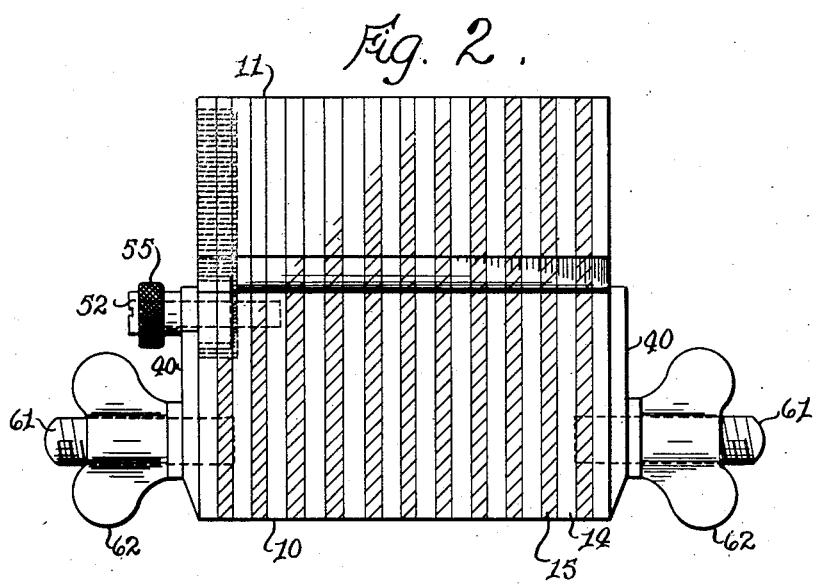
INVENTOR.
John H. Barrett.
BY Attorney
Chas. T. Hawley Patented Aug. 13, 1946

2,405,773

UNITED STATES PATENT OFFICE 2,405,773

MAGNETIC FIXTURE

John H. Barrett, Hudson, Mass., assignor to The La Pointe Machine Tool Company, Hudson, Mass., a corporation of Maine Application December 9, 1943, Serial No. 513,599

2 Claims. (Cl. 175—367)

This invention relates to a magnetic fixture by which work may be secured for machine operations.

It is the general object of my invention to provide a magnetic fixture so constructed that the work may be conveniently held at a selected angle relative to a supporting magnetic table or other structure.

A further object is to provide a magnetic fixture having an angularly adjustable work-holding element, together with means for adjusting said element, and means for securing the same in adjusted position. I also provide a construction such that the magnetic force which holds the work in the fixture also locks the fixed and movable parts of the fixture in selected angular relation.

My invention further relates to arrangements and combinations of parts which will be hereinafter described and more particularly pointed out in the appended claims.

A preferred form of the invention is shown in the drawing, in which

Fig. 1 is a side elevation of my improved fixture, with certain parts shown in section;

Fig. 2 is a front elevation thereof, looking in the direction of the arrow 2 in Fig. 1; and Fig. 3 is a partial sectional view, taken along the line 33 in Fig. 1.

Referring to the drawing, my improved fixture comprises a base 10 and a work support 11. Each of these parts is formed of alternately disposed plates 14 and 15 of magnetic and non-magnetic material respectively. The magnetic plates in the base are aligned with the magnetic plates in the work support and the non-magnetic plates are similarly aligned, as clearly shown in Fig. 2. The plates 14 are preferably of wrought iron or soft steel, and the plates 15 may be of brass or bronze or other non-magnetic material.

The several plates 14 and 15 forming the base are permanently assembled by cross rods 20 (Fig. 1), and the plates 14 and 15 forming the work support 11 may be similarly assembled by cross rods 21. The rods 20 and 21 may be headed or riveted in the outer plates to firmly hold the parts together.

The work support 11 is preferably formed as a segment of a cylinder, with a portion cut away to provide work-engaging surfaces 25 and 26, preferably disposed at 90° to each other. When the surface 25 is parallel to the bottom of the base 10, the surface 25 is preferably aligned with the top surface 27 of the base.

The base 10 is provided with an upper concave recess 30 to receive the cylindrical lower surface of the work support 11. A retaining plate 40 is secured to each end of the work support 11 in any convenient manner, as by screws 41. Each plate 40 is provided with a segmental rib 42 (Fig. 3) on its inner face, which rib is a sliding fit in a corresponding segmental groove 44 formed in the adjacent end face of the base 10. The ribs 42 and grooves 44 thus hold the base 10 and work support 11 securely in assembled relation, while permitting angular movement of the work support.

An end portion of the cylindrical outer surface of the work support 11 is preferably provided with gear teeth 50 forming a segmental rack which is engaged by a pinion 51 rotatably mounted on a stud 52 fixed in the base 10. The end face of the base is recessed as indicated at 53 to receive the pinion 51, and the pinion is provided with a knurled head 55 by which it may be conveniently turned. This construction provides convenient means for angularly adjusting the work support 11 on the base 10.

Each segmental plate 40 is provided with a segmental slot 60 through which extends a stud 61 fixed in the base 10. Wing nuts 62 on the studs 61 provide convenient means for clamping the base 10 and work support 11 in selected angular relation.

One end of the base 10 may be provided with the graduated scale indicated in Fig. 1, which is positioned to coact with an index arrow on the adjacent plate 40. By reference to the graduations, the angular displacement of the work support 11 may be conveniently ascertained.

With this construction, a piece of work W may be placed on the work support 11 and may be quickly and easily adjusted with the support to any desired angular position. After the adjustment is made, application of magnetic force will cause the work W to be firmly retained on the work support 11, the work support 11 to be firmly retained in the base 10, and the base 10 to be securely held on the working surface of a magnetic chuck or table.

It will be understood that my improved work-holding fixture is intended primarily for use on a supporting magnetic surface, as it has no provision for generating magnetic force in itself.

Having thus described my invention and the advantages thereof, I do not wish to be limited to the details herein disclosed, otherwise than as set forth in the claims, but what I claim is:

1. A work holding fixture comprising a base and a work support, each formed of a plurality of axially adjacent and axially alternated magnetic and non-magnetic plates, each plate having a work holding and angularly recessed edge portion and a segmental circular edge bearing portion and said plates being secured in a longitudinally extended assembled structure, said base and support having coacting concave and convex cylindrical surfaces, said support having end plates with segmental locking ribs and said base having segmental grooves to receive said ribs, whereby said base and support are continuously maintained in assembled sliding relation, and additional means to secure said support to said base in any selected angular position.

2. A work holding fixture comprising a base and a work support, each formed of a plurality of axially adjacent and axially alternated magnetic and non-magnetic plates, each plate in said support having a work holding and angularly recessed edge portion and a segmental circular edge bearing portion and said plates being secured in a longitudinally extended assembled structure, said base and support having coacting concave and convex cylindrical surfaces, said support having end plates with segmental locking ribs and said base having segmental grooves in its end surfaces to receive said ribs, whereby said base and support are continuously maintained in assembled sliding relation, said plates having segmental slots and said base having studs extending through said slots, and clamping nuts on said studs effective to clamp said plates and support to said base.

JOHN H. BARRETT.